(12) United States Patent
Creamer et al.

(10) Patent No.: US 8,024,713 B2
(45) Date of Patent: Sep. 20, 2011

(54) USING GHOST AGENTS IN AN ENVIRONMENT SUPPORTED BY CUSTOMER SERVICE PROVIDERS

(75) Inventors: Thomas E. Creamer, Boca Raton, FL (US); Bill H. Hilf, La Habra, CA (US); Peeyush Jaiswal, Boca Raton, FL (US); Neil Katz, Parkland, FL (US); Michael Mirt, Deerfield Beach, FL (US); Victor S. Moore, Lake City, FL (US)

(73) Assignee: International Business Machines Corporation, Armonk, NY (US)

( * ) Notice: Subject to any disclaimer, the term of this patent is extended or adjusted under 35 U.S.C. 154(b) by 938 days.

(21) Appl. No.: 11/963,921

(22) Filed: Dec. 24, 2007

(65) Prior Publication Data
US 2008/0104578 A1    May 1, 2008

Related U.S. Application Data

(63) Continuation of application No. 10/665,586, filed on Sep. 19, 2003, now Pat. No. 7,386,837.

(51) Int. Cl.
*G06F 9/44* (2006.01)

(52) U.S. Cl. ........ 717/127; 717/124; 717/131; 709/202; 709/203

(58) Field of Classification Search ........................ None
See application file for complete search history.

(56) References Cited

U.S. PATENT DOCUMENTS 6,012,152 A    1/2000    Douik et al.
(Continued)

OTHER PUBLICATIONS

Fox, A., et al., "Cluster-Based Scalable Network Services", ACM Digitial Library, pp. 78-91, (Oct. 1997).

(Continued)

*Primary Examiner* — Jason D Mitchell
(74) *Attorney, Agent, or Firm* — Novak Druce + Quigg LLP

(57) ABSTRACT

A method for supporting an application can include the step of receiving a problem indication relating to the application. The method can also identify a host within a grid environment, wherein a host can be a software object used by said application. A ghost agent can be associated with the host. The actions of the host can be replicated for use by the ghost agent. Data relating to the replicated actions can be recorded using the ghost agent. The indicated problem can be responded to, where the response can be based at least in part upon the recorded data.

16 Claims, 3 Drawing Sheets

U.S. PATENT DOCUMENTS

| | | | |
|---|---|---|---|
| 6,083,281 | A | 7/2000 | Diec et al. |
| 6,105,059 | A | 8/2000 | Al-Karmi et al. |
| 6,122,664 | A | 9/2000 | Boukobza et al. |
| 6,175,732 | B1 | 1/2001 | McDaniel |
| 6,266,805 | B1 | 7/2001 | Nwana et al. |
| 6,427,000 | B1 | 7/2002 | Mumford et al. |
| 6,430,707 | B1 | 8/2002 | Matthews et al. |
| 6,587,432 | B1 | 7/2003 | Putzolu et al. |
| 6,625,648 | B1 | 9/2003 | Schwaller et al. |
| 6,671,724 | B1 | 12/2003 | Pandya et al. |
| 6,681,243 | B1 | 1/2004 | Putzolu et al. |
| 6,714,976 | B1 | 3/2004 | Wilson et al. |
| 6,799,198 | B1 | 9/2004 | Huboi et al. |
| 6,886,020 | B1 | 4/2005 | Zahavi et al. |
| 2002/0087949 | A1 | 7/2002 | Golender et al. |
| 2002/0162053 | A1 | 10/2002 | Os |
| 2002/0174415 | A1 | 11/2002 | Hines |
| 2003/0014691 | A1 | 1/2003 | Abdelilah et al. |
| 2003/0028858 | A1 | 2/2003 | Hines |
| 2005/0066309 | A1 | 3/2005 | Creamer et al. |
| 2005/0149847 | A1 | 7/2005 | Chandler |

OTHER PUBLICATIONS

Wilson, L.F., et al., "Mobile Agents for Distributed Simulation", 1999 Advanced Simulation Technologies Conference, pp. 53-58, 1999.

Kapolka, A., et al., "A Unified Component Framework for Dynamically Extensible Virtual Environments", CVE '02, pp. 64-71, (Sep. 30-Oct. 2, 2002).

Martin, D.M., Jr., et al., "The Privacy Practices of Web Browser Extensions", Communications of the ACM, vol. 44, No. 2, pp. 45-50, (Feb. 2001).

Dasgupta, "A Probe-Based Monitoring Scheme for an Object-Oriented, Distributed Operating System" Sep. 1986, ACM, OOPSLA '86 Proceedings, pp. 57-66.

Hillbert, Redmiles, "Agents for Collecting Applicationusage Data Over the Internet" May 1998, ACM Autonomous Agents 98, pp. 149-156.

USING GHOST AGENTS IN AN ENVIRONMENT SUPPORTED BY CUSTOMER SERVICE PROVIDERS

CROSS REFERENCE TO RELATED APPLICATIONS

This application is a continuation of, and accordingly claims the benefit from, U.S. patent application Ser. No. 10/665,586, now issued U.S. Pat. No. 7,386,837, which was filed in the U.S. Patent and Trademark Office on Sep. 19, 2003.

BACKGROUND

1. Field of the Invention

This invention relates to the field of computer software and, more particularly to supporting applications using ghost agents.

2. Description of the Related Art

Numerous application and subscription providers offer customer support services. It can be laborious, however, for customer service representatives (CSRs) to determine the causes of customer problems and subsequently resolve the customer's problems. Part of the difficulty for the CSRs arises from communication issues. That is, CSRs interface with customers of vastly different technical backgrounds and experience levels. Novice users can lack the terminology and expertise to describe problems in a manner meaningful to the CSRs. In contrast, extremely proficient users can experience application-specific problems that most CSRs are not qualified to address or to understand.

Additionally, even if no significant communication hurdles exist between a user and a CSR, it can still be difficult if not impossible to recreate the problem that a user experienced. Recreating the problem can be an essential step in resolving it. One common difficulty in recreating user problems is that users often cannot remember the exact sequence of events leading up to a problem. Another difficulty relates to user problems that occur intermittently or randomly. Intermittent or random problems can be impossible for a user to predict or purposefully trigger and can therefore be almost impossible for a CSR to replicate. Yet another difficulty can be that the user's problem is unique to the hardware and software environment used by the user. In such an instance, a CSR using different hardware and software will not be able to recreate the problem on the CSR's system. The more complex that the environment being supported by a CSR is, the more difficult it can be for a CSR to resolve user problems.

One illustrative environment in which CSRs have difficulty is a grid computing environment. A grid environment can be a distributed computing environment where computing, application, storage, and/or network resources can be shared across geographically dispersed organizations. In the grid environment, a variety of computing resources can be transparently utilized by users on an as-needed basis. Users can therefore consume computing resources in a manner similar to the commercial consumption of electricity and water. Accordingly, a grid computing environment can dynamically coordinate a collection of users, applications, and organizations with a multitude of resources provided by numerous computing devices.

Complicated interactions can occur between different grid-based applications, since the applications can share a common pool of computing resources. These complex interactions can be a significant the source of user problems. When informed of the user problems, however, a CSR can be unable to simulate the dynamic conditions within the grid environment that resulted in the problems. Additionally, a CSR may not be able to correct problems experienced within the supported application that result from flaws within other applications that share grid resources with the supported application. Consequently, in order to better support problems common to a grid environment, CSRs need better tools that facilitate the identification and resolution of user problems.

SUMMARY OF THE INVENTION

The present invention includes a method, a system, and an apparatus for providing computer support using ghost agents. More specifically, a user can experience problems using an application and contact a customer service representative (CSR). The CSR can identify a host relating to the user's identity within the application, where the host is a software object. The CSR can assign a ghost agent to the identified host. The ghost agent can monitor and record the actions of the user.

In one embodiment, the CSR can execute tests using the ghost agent, where test input can be extracted from the recorded actions of the host. In another embodiment, debugging actions can be performed using the ghost agents. For example, a processing halt point can be established for one or more replicated actions. The CSR can examine system parameters at this halt point to determine the problem source. In yet another embodiment, operational performance and/or system requirement thresholds can be input into the ghost agents. The ghost agents can compare the input thresholds with results from the replicated actions. In each of these embodiments, the CSR can convey commands to a multitude of ghost agents and can receive messages reporting the results of these commands.

One aspect of the present invention can include a method for supporting an application. The method can include the step of receiving a message indicating a problem with the supported application. The method can also identify a host within a grid environment, wherein the host can be a software object used by the application. A ghost agent can be associated with the host. The host can move within the grid environment and the ghost agent can responsively move in accordance with the movement of the host. Movement in a grid environment refers to the movement from one grid component to another component within a grid and/or movement from one grid to a different grid of the grid environment. The ghost agent can also disassociate itself from the host in order to associate itself with a different host. The actions of the host can be replicated for use by the ghost agent and data relating to the replicated actions can be recorded using the ghost agent. In one embodiment, a location external to the ghost agent can be identified to which the recorded data can be conveyed.

The indicated problem can be responded to based at least in part upon the recorded data. In one embodiment, the indicated problem can be automatically detected by components of the grid computing environment. For example, recorded data relating to a replicated action can be compared with one or more operational thresholds provided by the ghost agent. If any of the thresholds are not satisfied, a problem indication message can be responsively generated and suitable actions taken. One such suitable action can include recording the results of the comparisons for use by customer service representatives (CSRs) and/or system administrators. Another action can include automatically routing application activity from an area of the grid environment in which the problem occurred to an alternative area of the grid environment. Further, when the method is implemented in a self-correcting system, the problem can be automatically resolved based at least in part upon the recorded data.

In another embodiment, the method can be a manual process involving at least one CSR using a customer service interface. The customer service interface can utilize ghost agents to respond to problems. For example, a CSR can receive a message from a user, which indicates the user recognized problem. The user can be represented within the application by a particular host to which a ghost agent can be associated. The data recorded by the associated ghost agent can be used to determine the actions of the user that resulted in the problem. In responding to the problem, one or more tests can be executed using the ghost agent. The ghost agent can use the recorded data as input for the tests. Further, a debugging action can be performed using the ghost agent, where the debugging action can be performed against one or more replicated actions.

Another aspect of the present invention can include a customer service environment including multiple hosts, one or more ghost agents, a customer service application, and/or a service data store. The hosts can be software objects for an application domain, where the application domain can be an application distributed within a grid environment. The ghost agents can be associated with one or more hosts. Each ghost agent can move within the grid environment to follow movements of the host with which it is associated. The customer service application can utilize ghost agents to determine actions leading to one or more problems with the application. The customer service application can also debug the determined problems using the ghost agents. The service data store can be communicatively linked to a multitude of ghost agents and to the customer service application. Additionally, the service data store can record data generated by the ghost agents for use by the customer service application.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The present invention can include a method, a system, and an apparatus for supporting customers within a customer service environment using ghost agents. More specifically, an application can be installed within a grid computing environment. The application can include a customer service application used by customer service representatives (CSRs) to assist users. Users can contact the CSRs to report problems with the application. Further, the application can include some self-monitoring aspects that automatically detect and report application problems to the CSRs. The CSRs can then selectively monitor application activities to determine actions that resulted in the reported problem. Once the actions leading to problems are identified, the CSR can perform tests and/or debugging actions to resolve the problem.

Automatic problem detection, action identification, and problem resolution tasks can involve associating ghost agents to hosts, where a host can be a software object used or accessed by the application. The host can move from location to location within the grid environment. When the host moves, an associated ghost agent can responsively move in accordance with the movement of the host. The ghost agent can replicate the actions of the host and record data related to the replicated actions. For example, the ghost agent can record user-triggered activities and the results of these activities.

As used herein, a ghost agent can be a self-managing, self-identifying software object capable of performing predefined tasks in a self-sufficient manner. Any suitable technique can be used to attach the ghost agent to the host including, but not limited to, debugging attachment techniques, system calibration techniques, hardware performance testing techniques, and similar binding methodologies.

Figure 1:
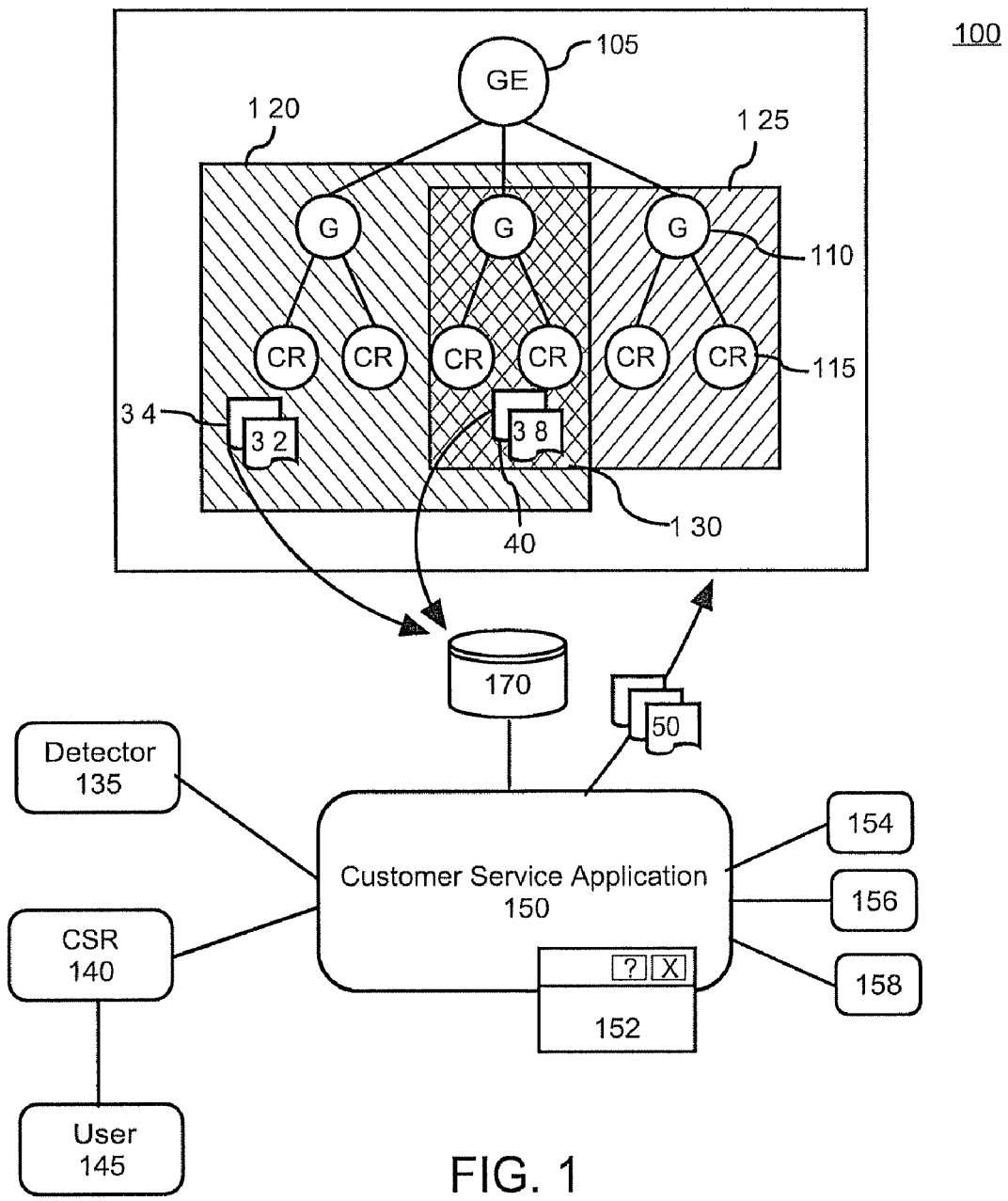
FIG. 1 is a schematic diagram illustrating a customer support system in which ghost agents can be used in accordance with the inventive arrangements disclosed herein.

FIG. 1 is a schematic diagram illustrating a customer support system 100 in which ghost agents can be used in accordance with the inventive arrangements disclosed herein. The system 100 can include a grid environment 105 in which applications 120 and 125 are disposed. The applications 120 and 125 can be supported by a customer service application 150. The grid environment 105 is illustrated as a series of nodes beginning with a root node labeled "GE" for grid environment. The grid environment 105 can include one or more grids 110, where each grid 110 is represented by a node labeled "G." Each grid 110 can further provide one or more computing resources 115, represented by nodes labeled "CR."

The grid environment 105 can be a distributed computing environment that includes a multitude of hardware and software components represented as computing resources 115. The computing resources 115 of the grid environment 105 can be accessible on an as needed basis to a multitude of applications, users, and organizations. The grid environment 105 can include any hardware platform, operating system, storage scheme, and/or software resource that adheres to the standards and protocols defined for the grid environment 105.

Each of the grids 110 can be a logical segmentation of the grid environment 105 that includes one or more groupings of physically differentiable hardware resources. For example, the grids 110 can each include a multitude of mainframe or supercomputers. Additionally, the grids 110 can each include several local area networks, workgroups, and computing arrays arranged according to any topography including, but not limited to, star topographies, Fiber Distributed Data Interface (FDDI) rings, token rings, and the like.

Computing resources 115 can include low-level and high-level resources as well as software and hardware resources. Low-level resources can include processing cycles of a CPU, storage space in a memory, capacity, bandwidth within a communication pathway, and other such hardware resources. Low-level resources can also include microcode routines, threads, CPU processes, and other such software resources. High-level hardware computing resources 115 can include printers, fax machines, copiers, input devices, display devices, database storage space, removable media, and the like. High-level software computing resources 115 can include algorithms and heuristics such as database search routines, spell-checking routines, transcription services, text-to-speech services, format conversions, Web services, and the like.

Application domains 120 and 125 can exist within the grid environment 105, each functioning as a "virtual application." Unlike traditional applications that generally reside on a single server, application domains 120 and 125 can physically span across several grids 110 and can utilize a variety of geographically dispersed computing resources 115, yet logically function as a single application having a single user interface. Additionally, a set of computing resources can be utilized by more than one application domain. For example, application domain 120 and application domain 125 share a portion of computing resources labeled shared segment 130. Exemplary types of application domains 120 and 125 can include productivity applications, entertainment applications, development applications, office applications, utility applications, multimedia applications, data management applications, graphic design applications, and the like.

Application domains 120 and 125 can include a multitude of hosts 32 and 38, which can be software objects used by the application domains 120 and 125. Ghost agents 34 and 40 can be associated with hosts 32 and 38 respectively. Hosts 32 and 38 can periodically move from location to location within the grid environment 105. For example, the host 32 can be an object representing a user of the application domain 120. As such, the host 32 can move within the application domain 120 depending upon which application features the user triggers and depending upon the grid locations that contain to the requested features.

The customer service application 150 can be a software application for monitoring user interactions within a designated application domain for purposes of assisting application users with problems. The customer service application 150 can also aid in resolving customer problems by directing users from problem grid segments to alternative grid segments, by debugging problem areas, by implementing test solutions, and by verifying implemented fixes to resolve user problems. In one embodiment, the customer service application 150 can register hosts 32 and 38 in order to perform host-based operations. Similarly, the ghosts 34 and 40 can be registered with the customer service application 150. The customer service application 150 can include a service interface 152 allowing authorized users, such as a CSR 140, to access the features of the customer service application 150. Further, the customer service application can be communicatively linked with a detector 135, a service data store 170, a debugger 154, a testing application 156, and a validation application 158.

The detector 135 can be an automated problem detection application. Accordingly, the detector 135 can receive system status messages from the application domains 120 and 125, from grid environment components 105 including hardware, and from ghost agents 34 and 40. For example, if a hardware component within the grid environment 105 fails or is overloaded, the detector 135 can transmit a problem indication message to the customer service application 150. In one embodiment, the detector 135 can contain error-handling functions. For example, if the detector 135 determines that a problem exists by analyzing data of the service data store 170, the detector 135 can automatically route user requests from the problem segment or component to an alternate grid location. Further, any error-handling functions and/or detection functions of the detector 135 can be configured using the customer service application 150.

The service data store 170 can be any centralized storage location where data from the ghost agents 34 and 40 can be stored for use by the customer service application 150 and other applications. The service data store 170 can store data in any fashion using any data methodologies known in the art including database storage methodologies, file-based storage methodologies, and other formats. Further, the service data store 170 can store data within removable storage devices, fixed storage devices, network storage device, and other such hardware.

When the customer service application 150 operates with the grid environment 105, service application commands 50 can be directed toward designated ghost agents 34 and 40 disposed throughout the grid environment 105. The service application commands 50 can trigger the ghost agents 34 and 40 to execute customer service procedures resulting in output messages in which results of the commands 50 are recorded. The ghost agents 34 and 40 can convey these output messages to the service data store 170. Subsequently, the customer service application 150 can access and utilize the output messages.

For example, a user 145 can contact the CSR 140 and report a problem with application domain 120. The CSR 140 can inform the user 145 to continue using the application domain 120 and that the problem is presently being worked on. The user 145 can additionally be instructed to inform the CSR 140 the next time the problem is discovered because active problem tracking procedures have been initialized. The CSR 140 can then identify a host 32 associated with the user 145 and bind the ghost agent 34 to the host 32. The ghost agent 34 can monitor user 145 actions within the application 120 and send ghost 34 generated output to the service data store 170 for storage and/or recordation.

When the problem next occurs, the CSR 140 can determine the exact conditions that resulted in the problem. If the problem is primarily a training problem, which results from a misunderstanding on the part of the user 145 as to how the application domain 120 operates, the CSR 140 can contact the user 145 and correct the misunderstanding. If the problem is an actual system problem, the CSR 140 can initiate problem solving procedures. For example, the customer service application 150 and related software maintenance tools, which include the debugger 154, the testing application 156, and the validation application 158, can be used to debug, test, correct, and verify corrections in the application domain 120 code. The CSR 140 can contact the user 145 once the problem has been fixed as a follow up action for the reported problem.

The debugger 154 can be a program configured to search for and correct errors or problems existing within other software. Additionally, the debugger 154 can debug software installed within the grid environment 105, which can include a test grid environment and/or a production grid environment. The debugger 154 can utilize any of the ghost-related debugging methods described herein to implement debugging features within the grid environment 105. For example, a portion of the service application commands 50 can be debugging commands directed toward designated ghost agents 34 and 40. Further, a portion of the output messages generated by the ghost agents 34 and 40 that are conveyed to the service data store 170 can include debugging output.

The debugging features implemented by the debugger 154 are not limited to a particular subset of features. Rather, any debugging features commonly used in the art can be implemented using the debugger 154. Exemplary debugging programs exhibiting common debugging features include GDB by the GNU project, the Java Platform Debugger Architecture (JPDA) by Sun Microsystems, Inc. of Santa Clara, Calif., the IBM Distributed Debugger by International Business Machines (IBM) Corporation of Armonk, N.Y., and Built-in Linux Kernel Debugger (KDB) by Silicon Graphics Incorporated (SGI) of Mountain View, Calif.

In one embodiment, the debugger 154 can include a debugging interface. The debugging interface can allow the CSR 140, system developers, and other users to access the functionality of the debugger 154. The debugging interface can be integrated with the service interface 152 or can be a separate interface. It should be noted that the data store that the debugger 154 uses can include a debugging data store exclusively reserved for debugging data, the service data store 170, and any other data storage space.

The testing application 156 can be a software development tool configured to test applications within grid-environment 105. The testing application 156 can function in conjunction with the validation application 158, thereby allowing test routines to first be executed and then be verified. The testing application 156 can also include a test interface that permits authorized users to access the functionality of the testing application 156. The testing interface can be integrated with the service interface 152 or can be separate from the service interface 152. Additionally, the testing application 150 can issue test commands, which can be one type of service command 50, that can be conveyed to ghost agents 34 and 40 to produce test output. The test output can be conveyed to the service data store 170, to a test data store, and to any other data storage space.

In one embodiment, the CSR 140 and/or software technicians can utilize the test interface to access the testing application 156. Once an instance of the test interface is open, the application domain 125 can be chosen from a selection of application domains. The procedures, methods, parameters, and graphical user interface (GUI) views of the application domain 125 can be presented within the test interface. The CSR 140 and/or software technician can select a presented software object and generate a test routine for it. Subsequently, the generated test routines can be executed. For example, a test routine can include a driver and a stub written for a particular procedure. The test routine can be executed in place of or in addition to the procedure for which it was written.

The validation application 158 can be a software maintenance tool configured to validate and/or verify software fixes, the load induced by software upon a system, and software performance characteristics. Additionally, the validation application 158 can manage validation operations and resulting data for multiple ghost agents deployed within the grid environment 105. A validation interface, which can be integrated with or separate from the service interface 152, can be provided so that authorized users can access the features of the validation application 158. Further, the validating application 158 can issue validation commands, which can be one type of service command 50, that can be conveyed to ghost agents 34 and 40 to produce validation output. The validation output can be conveyed to the service data store 170, to a validation data store, and to any other data storage space.

In one embodiment, whenever a specified computing resource 115 is used by the application domain 120, the ghost agent 34 can compute the quantity of the computing resource 115 consumed by the application domain 120. This quantity can be compared to a resource consumption threshold. Further, a ghost agent 34 can be associated with a hardware device driver to monitor activities of a selected hardware device. The ghost agent 34 can determine a load upon for the associated hardware device every $n^{th}$ second. The ghost agent 34 can then compare the determined load against an inputted load threshold. Additionally, the validation application 158 can be used to perform comparisons between test output generated by ghost 34 and the output resulting from host 32.

In another embodiment, an authorized user can utilize the validation interface to access the validation application 158. The validation application 158 can visually present ghost agent 34, ghost agent 40, and every other ghost agent disposed within the grid environment 105. The user can select the ghost agent 34 and can establish validation data for the ghost agent 34 using the validation interface. The user-entered validation data can be conveyed to ghost agent 34 using validation commands. The ghost agent 34 can also receive other validation commands in order to direct the ghost agent 34 to perform desired comparisons. The comparisons can result in validation output, which can be conveyed to the service data store 170.

One illustrative example of ghost agents 34 and 40 operating within a grid environment 105 can relate to a Massive Multi-Player Gaming (MMPG) system, which can represent application domain 120. In the example, a player, corresponding to host 32, can experience erratic behavior when campaigning in a suspect area of the MMPG. The player 145, can contact the CSR 140 and explain the problem. In response, the CSR 140 can bind ghost agent 34 to the host 32. In one embodiment, the MMPG can include user selectable options that facilitate error reporting and resolution while minimizing contacts between the player and the CSR 140. For example, the MMPG interface can include a user-selectable track problems option. The track problems option can automatically associate a ghost agent 34 with the host 32 without CSR 140 involvement. Whenever a player has enabled the problem tracking option with the MMPG, a further option for reporting an experienced problem can be enabled for the player. Selection of the problem reporting option can convey a problem indication message to the customer service application 150.

Once a problem has been reported by the player, the actions leading up to the problem can be analyzed. This analysis can involve comparing operational metrics resulting from player actions with application domain 120 specifications. Tests routines can be executed using the ghost agent 34 that can use previously recorded player actions as test input. Further, debugging actions can be performed against previously executed player actions. Proposed problem fixes can be verified before being implemented within the production version of the application domain 120. Once the problem reported by the user 145 has been fixed, the CSR 140 can contact the user 145 as part of a follow up procedure. The above MMPG example is just one possible application within which ghost agents 34 can be utilized to support user 145 problems. The invention, however, is not limited in this regard and any application type can be supported using the inventive arrangements disclosed herein.

Figure 2:
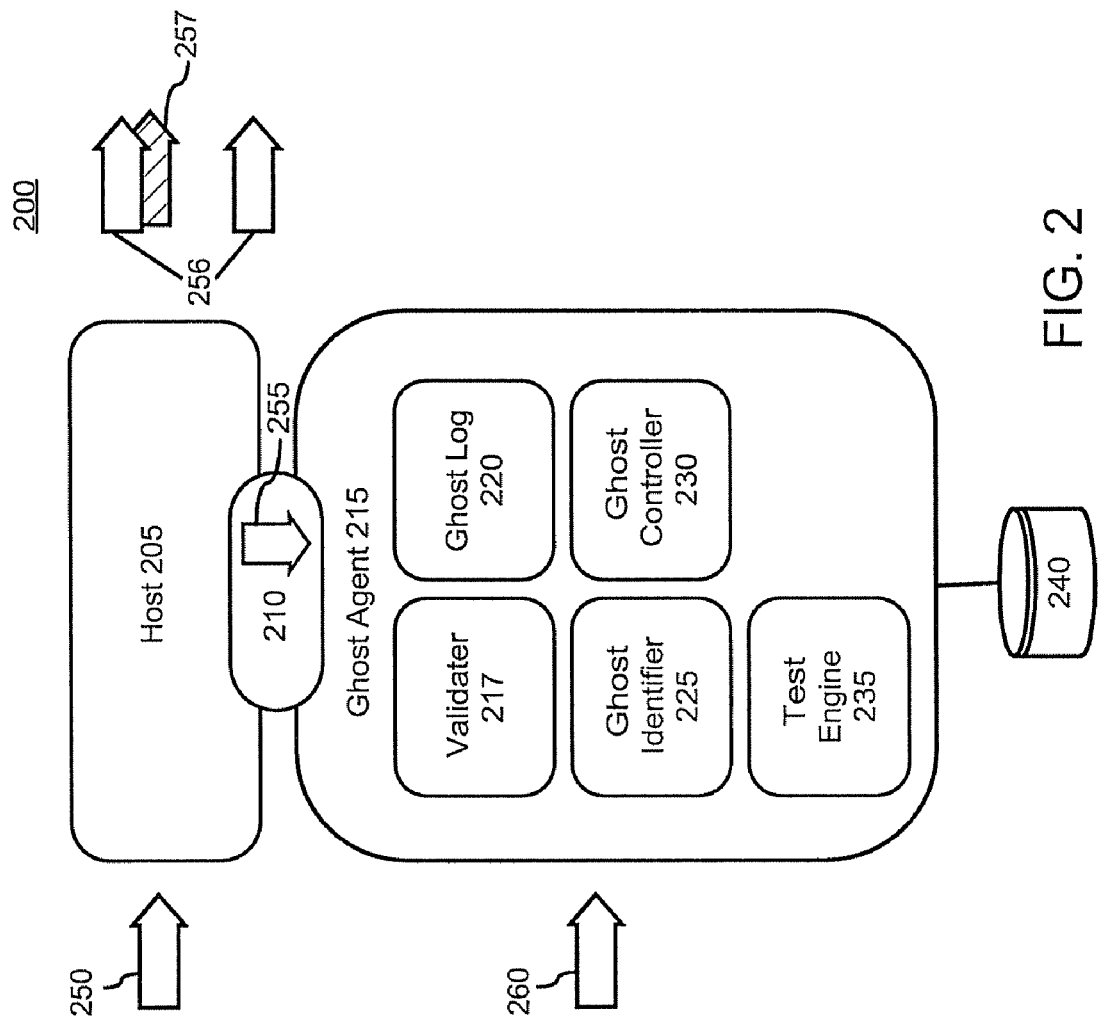
FIG. 2 is a schematic diagram illustrating a host and a ghost agent within a grid environment in accordance with the inventive arrangements disclosed herein.

FIG. 2 is a schematic diagram illustrating a host 205 and a ghost agent 215 within a grid environment 200 in accordance with the inventive arrangements disclosed herein. The host 205 can be any definable software unit within the grid environment 200 that can receive input 250 and execute actions 256. The input 250 can include messages of any type conveyed to the host 205, such as keyboard input, procedural calls, and the like. The actions 256 can be relatively high-level actions as well as low-level actions. High-level actions can include calls to software routines that can contain one or more external procedural calls. Low-level actions can include hardware device calls and the execution of one or more processes or threads.

The ghost agent 215 can be associated or bound to the host 205 through the ghost interface 210. The ghost interface 210 can generate replicated actions 255 that are copies of the actions executed by the host 205, using any of a variety of suitable techniques. For example, techniques used by software debugging programs to attach monitors to running programs in order to evaluate system behavior and step through code can be used by the ghost interface 210. Alternatively, techniques used by system calibration and hardware performance testing utilities can be used by the ghost interface 210 to bind the ghost agent 215 with the host 205. Further, operating system level commands, tools, and functions analogous or similar to the UNIX commands "strace" and "ptrace," can potentially be used by the ghost interface 210 to bind the host 205 with the ghost agent 215. Strace is a commonly used system call trace, i.e. a debugging tool that prints out a trace of all the system calls made by another process and/or program. Additionally, ptrace is a commonly used system call that enables one process to control the execution of another. Ptrace also enables a process to change the core image of another process.

More specifically, the ghost interface 210 of one embodiment can be implemented as one or more Java software objects. In such an embodiment, the ghost interface 210 can cause a Java web server to be initialized with the Java debugging command, "java_g." The ghost interface 210 can utilize a Java debugging object to replicate the actions of the host 205 and convey the replicated actions 255 to the ghost agent 215. Additionally, passwords provided by the host 205 can be echoed to the ghost interface 210 and used to authorize the ghost agent 215 as appropriate.

In another example within a Java environment, both the host 205 and the ghost agent 215 can be implemented as different Java classes and the ghost interface 210 can appropriately convey messages between the host 205 and ghost agent 215 classes. In yet another example the ghost interface 210 can be implemented using a Java/Tcl blend, where Tcl is a computing language that interoperates with Java code segments. In that case, the ghost interface 210 can use the "java:: bind" command to generate callback scripts from events in the host 205. The call back scripts can replicate actions for the ghost agent 215.

The implementations of the ghost interface 210 are not restricted to the Java programming language as one of ordinary skill in the art can utilize any of a variety of different programming languages and binding techniques. For example, the ghost interface 210 can be implemented using a GNU debugger distributed by the Free Software Foundation and an Apache server distributed by the Apache Software Foundation. The GNU debugger can be attached to an Apache server causing all activity occurring within the server to be directed to the GNU debugger. The host 205 can be disposed within the Apache server and the ghost agent 215 can utilize replicated actions of the host 205 provided by the GNU debugger.

Regardless of how the ghost interface 210 is implemented, the ghost agent 215 can manipulate the replicated actions 255 when performing customer service operations. The replicated action 255 can be a passive or "read only" action that has no operational effect upon the grid environment 200. Accordingly, the passive action can be stored and not rebroadcast or sent into the grid environment 200 to be executed. For example, a passive action can involve analyzing a replicated action to determine performance metrics, resource utilization metrics, and/or estimated load metrics relating to the replicated action. In another example, a passive action can involve executing a test routine within the ghost agent 215 generating test output.

The ghost agent 215 can also generate one or more active actions 257 that are executed within the grid environment 200. Active actions 257 can be used to place a system in a selected state so that the selected state can be tested. While active actions 257 can be commonly used by ghost agents 215 disposed within a test segment of the grid environment 200, active actions 257 can also be used within production segments of the grid environment 200. For example, an active action 257 can trigger a fault condition in order to validate fault-reporting features and/or error handling routines of a system. When used within production segments, however, care must be taken to assure the active actions 257 are not harmful to users of the grid environment 200.

In one embodiment, the ghost agent 215 can receive control signals 260 from an external source, such as a test application. The control signals 260 can include messages from a customer service application, messages from other ghost agents 215, and messages generated by components of the grid environment 200. For example, the control signals 260 can specify that a test routine that is to be executed. In another example, the control signals 260 can include validation specifications. Additionally, the control signals 260 can synchronize multiple ghost agents 215 with one another for customer service operations that involve multiple ghost agents 215. Alternatively, control signals 260 can cause a ghost agent 215 to associate and/or disassociate with a host 205, can alter the level of logging performed by the ghost agent 215, can cause the ghost agent 215 to terminate, and can similarly control the ghost agent 215.

The ghost agent 215 can include a validater 217, a test engine 235, a ghost log 220, a ghost identifier 225, and a ghost controller 230. The validater 217 can compare data related to the replicated action to validation data. For example, the validater 217 can analyze a replicated action 255 as well as other system input to determine performance metrics, resource utilization metrics, load metrics, and/or output resulting from actions of the host 205. This data can be compared against corresponding validation data, which can include performance requirements, resource utilization specifications, and load specifications inputted into the ghost agent 215 as well as test output generated by the ghost agent 215.

For example, in one arrangement, the validation data input into the validater 217 can include a time threshold for executing a designated action. In such an arrangement, the validater 217 can determine a time required to execute a corresponding host 205 action. The validater 217 can then compare the time threshold to the determined time. Further, the validater 217 can indicate whether the time threshold has been exceeded or not. Accordingly, part of the validation output produced by the validater 217 can include a compliance indicator detailing this result.

In another arrangement, the validation data input into the validater 217 can include a resource threshold for resources consumed by the designated action. In such an arrangement, the validater 217 can determine resources consumed by an action and compare the determined value to the resource threshold. In yet another arrangement, the validation data input into the validater 217 can include a system load threshold. In such an arrangement, the validater 217 can determine a system load when the host 205 executes an action and compare the determined value to the system load threshold.

The test engine 235 can load test routines into the ghost agent 215, can execute the test routines, and can generate test output. The execution of the test routines can result from receiving test commands that trigger one or more test operations. Test routines can also be automatically executed based upon the occurrence of a monitored event. For example, if a particular replicated action 255 is received, the test engine 235 can responsively execute a test routine.

When executing test routines, the test engine 235 can analyze, manipulate, and extract data from the replicated actions 255. For example, a test routine may require one or more parameters to be extracted from one or more replicated actions 255. Test routines can also be executed in combination with other test routines and/or replicated actions 255.

For example, a replicated action 255 can trigger three sequentially executed procedures specified as module A, B, and C. A particular test routine, called module $B^{TEST}$, can be a replacement for the second procedure, B. Accordingly, when the test engine 235 executes replicated action 255, module A, $B^{TEST}$, and C can be sequentially executed.

The ghost log 220 can record the data relating to the replicated actions 255, such as debugging actions, validation actions, and testing actions, thereby creating a log. The ghost log 220 can be configured to record all activities relating to the associated host 205 or can be configured to record only selected activities. For example, in one embodiment, the ghost log 220 can record only those comparisons of the validater 217 where specifications are not met, thereby generating a problem log. In another example, the ghost log 220 can record a statistically relevant portion of actions, such as recording data relating to every $n^{th}$ replicated action 255 or every $n^{th}$ validation comparison. The ghost log 220 can also capture system information and add annotations from this system information to the generated log.

For example, system clock information can be captured and used to annotate the time between receiving a replicated action 255 and the completion time for an associated active action 257. Operational metrics, including load metrics, for the replicated action can be gathered in this fashion. In another example, metadata information contained within message flows, such as input 250, and active action 257, can be recorded and/or utilized by the ghost log 220. Additionally, the ghost log 220 can time stamp data relating to replicated actions 255.

The ghost log 220 can also record the log information in a ghost log repository 240. The ghost log repository 240 can be a temporary buffer or a persistent data storage area. If the ghost log repository 240 is external to the ghost agent 215, any of a variety of different mechanisms can be utilized to convey the log data to the ghost log repository 240.

While ghost log repository 240 is depicted as being external and possibly remotely located from the ghost agent 215, it should be appreciated that the ghost log repository 240 can also be an allocated memory space internal to the ghost agent 215. For example, the ghost log repository 240 can be a dynamically allocated segment of random access memory (RAM) available to the ghost agent 215 as needed.

In one embodiment, an intermittent communication link, such as a unicast or a point-to-point communication link can be established between the ghost log 220 and the ghost log repository 240 through which data can be conveyed. In another example, a buffer space, which can be another embodiment of ghost log 220, within the ghost agent 215 can record log information. Whenever the buffer reaches a specified volume of data, a message containing the buffered information can be conveyed to the ghost log repository 240. The buffer within the ghost agent 215 can then be cleared and used to store fresh data.

In yet another example, ghost agents 215 can convey log data to a local data server. The local data server can then convey all received log data to the ghost log repository 240 from time to time or on a periodic basis. In still another example, the ghost agent 215 can intermittently deposit log data to a local location. Then a data-reaping object can gather packets of the log data that have been locally deposited by the various ghost agents 215. The packets of log data can be conveyed to the ghost log repository 240 by the data-reaping objects.

The ghost identifier 225 can provide identification, authorization, and security related functions for the ghost agent 215. That is, the ghost identifier 225 can identify the ghost agent 215 to the various components of the grid environment 200. Accordingly, servers in the grid environment 200 can have an awareness of the ghost agent 215. The grid servers can then use policy-based controls to manage permissions, authentication, resource utilization, and security for the ghost agents 215. Ghost agents 215 adhering to the established policies can be permitted to automatically enter and exit the various grids of the grid environment 200.

The ghost agent 215 can be granted different access privileges to computing resources as the ghost agent 215 traverses from one grid in a grid environment 200 to another depending on grid-based policies. Privileges afforded the ghost agent 215 can be determined in any manner known in the art. For example, a ghost agent 215 can replicate the passwords provided by the host 205 and use the replicated passwords to provide authentication to the grid environment 200. In another example, before a ghost agent 215 can be permitted to follow an associated host 205 from one grid in the grid environment 200 to the next, a password or digital certificate unique to the ghost agent 215 can be required. The ghost agent 215 can receive the same system privilege level within the grid environment 200 as the host 205 or can receive a different privilege level.

The ghost controller 230 can manage the ghost agent 215. For example, the ghost controller 230 can establish a life span for a particular ghost agent 215 so that the ghost agent 215 self-terminates after a designated period. In another example, the ghost controller 230 can restrict the computing resources consumed by the ghost agent 215, thereby freeing up system resources in the grid environment 200 for improved operational performance. Alternately, the ghost controller 230 can increase the computing resources consumed by the ghost agent 215, thereby slowing down operational performance in the grid environment 200. Slowing performance can be beneficial when simulating a load during testing.

In one embodiment, the ghost controller 230 can accept control signals 260 from an external source. Further, the ghost controller 230 can include a listener object capable of responding to particular events broadcasted by a corresponding notifier object. For example, a server could broadcast a signal causing all ghost controllers 230 to limit the resource consumption of all ghost agents 215 presently disposed in the server. Similarly, a grid wide broadcast could cause specified ghost agents 215 to self-terminate.

It should be noted that there are many possible ways to implement the elements of system 200. Implementation details can depend upon the conditions of the host 205, the specifics of the ghost agent 215, and details concerning the grid environment 200 itself. One of ordinary skill in the art can apply the teachings disclosed herein to a variety of different conditions using well-known software engineering techniques and principles.

For example, the details of the test engine 235 can depend upon implementation choices. In one embodiment, the host 205 can execute actions A, B, and C by calling three separate external routines; call A, call B, and call C, respectively. The ghost agent 215 can determine the routine calls by examining the replicated actions 255 that correspond to the calling actions. In one arrangement, drivers and stubs can be written for call A, call B, and call C. The drivers and stubs can be executed by the test engine 235 so that the test engine 235 need not externally call routines A, B, and C. In another arrangement, the test engine 235 can perform calls to the external routines, but an indicator can be relayed to the external routines to prevent operational changes from occurring. That is, each of the external routines can be executed in a disabled mode.

In yet another arrangement, substitute routines for routines A, B, and C can exist and be called by the test engine 235 in place of calling A, B, and C. For instance, the substitute routines can be implemented within a test environment and can be approximately equivalent to their counterparts that are implemented within a production environment. In another arrangement, the host 205 can execute actions A, B, and C using internal routines. The internal routines will generate actions that are copied into the ghost agent 215 as replicated actions and can be directly executed by the test engine 235.

Figure 3:
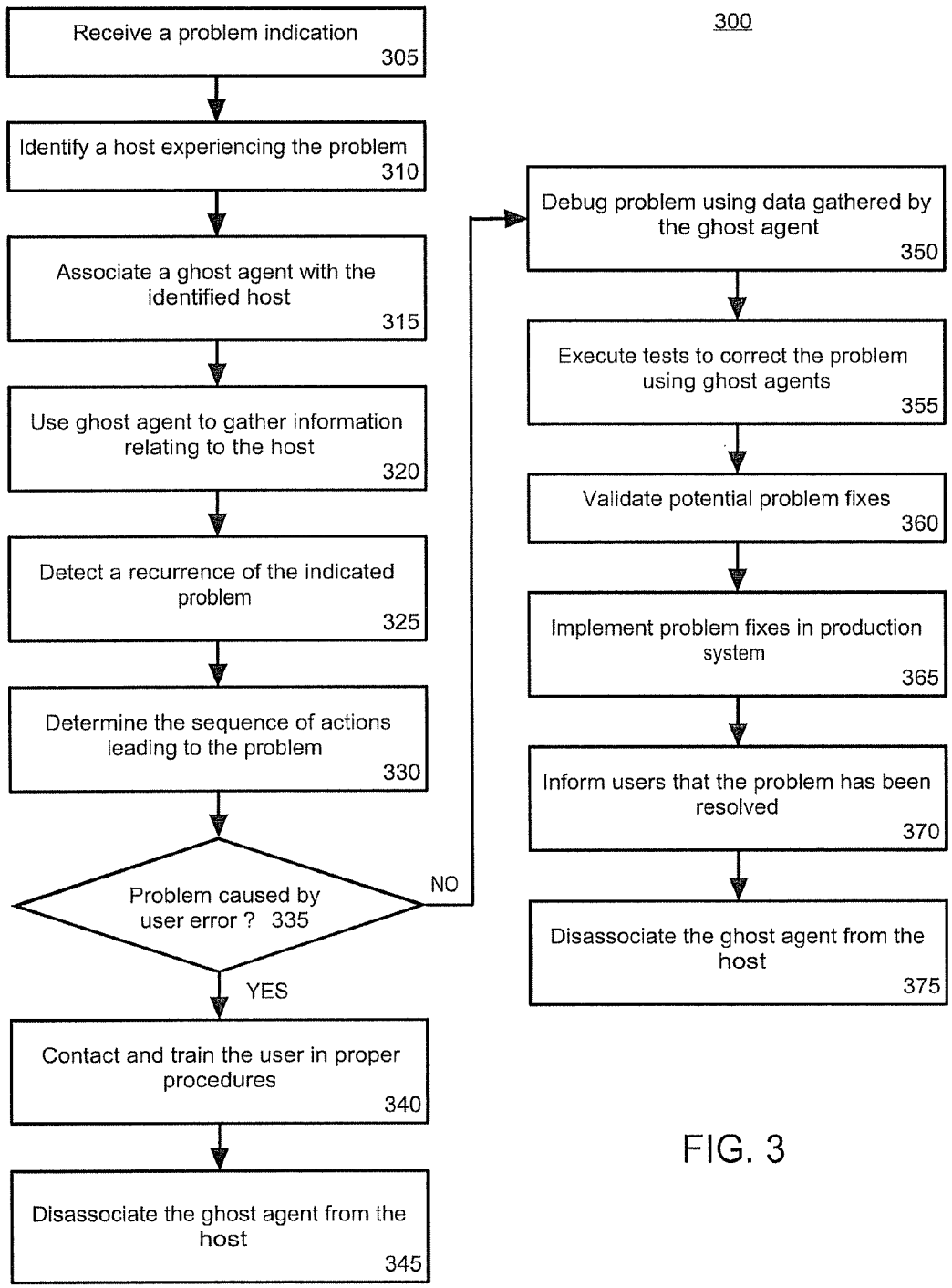
FIG. 3 is a flow chart illustrating a method for servicing problems using ghost agents in accordance with the inventive arrangements disclosed herein.

FIG. 3 is a flow chart illustrating a method 300 for servicing problems using ghost agents in accordance with the inventive arrangements disclosed herein. The method 300 can be performed in the context of supporting an application installed within a grid environment. The method 300 can begin in step 305, where a problem indication can be received. For example, a user of the application can report a problem to a CSR. Alternatively, problem detection software and hardware can automatically detect application problems and report the problem to a customer service application as appropriate. In step 310, a host experiencing the problem can be identified. A host can be a software object included within the grid-based application. If the problem is reported by a user, the host can represent the user within the application. The host can also represent an application component and/or a hardware component experiencing a problem.

In one embodiment, if the problem is relates to an isolatable segment of the grid environment and if alternative grid segments can provide similar capabilities as the problematic grid segment, the grid environment can automatically route users and processes from the problem segment to the alternative segment until the problem is resolved.

In step 315, a ghost agent can be associated with the identified host. In step 320, the ghost agent can gather information relating to the host. For example, the ghost agent can log and record the actions of the host. The ghost agent can also gather system information relating to the actions of the host including, but not limited to, execution time for actions, resources consumed, latency experienced, and the load upon system components at the time of action executions. In step 325, a recurrence of the indicated problem can be detected. In one embodiment, the detection can be a manual event that requires a user having the problem to report the problem to a customer service representative. In another embodiment, a threshold indicative of the problem can be loaded into the ghost agent at the time the ghost agent is associated with the host. The ghost agent can, thereafter, compare the loaded threshold against system conditions. If the threshold is exceeded, a problem can be automatically reported.

In step 330, a sequence of actions leading to the detected problem can be determined by examining the output recorded by the ghost agent. In step 335, a determination can be made as to whether the problem was caused by a user error. If so, the method can proceed to step 340 where a CSR can contact the user and train the user in the proper procedures. In particular embodiments, a CSR need not be involved in step 340 and automated messages detailing the user problems and/or proper procedures can be substituted for human interactions. In step 345, once the problem has been resolved, the ghost agent can be disassociated with the host.

If the problem was a system error and not a user error as determined by step 335, the method can proceed to step 350. In step 350, a technician can be informed of the problem, the source of the problem, and can be conveyed the ghost generated data. The technician can then perform debugging operations using one or more ghost agents. In step 355, the technician can also use ghost agents to execute tests to correct the identified problem. In step 360, ghost agents can be used to validate potential problem fixes. Once fixes have been validated, the method can proceed to step 365, where problem fixes can be implemented in a production system. In step 370, users can be informed that the reported problem has been resolved. Finally, in step 375, the ghost agent can be disassociated from the host.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A customer service environment comprising:
   a plurality of hosts, wherein said hosts are software objects for an application domain distributed within a grid environment, said grid environment being a distributed computing system that includes a plurality of hardware and software components;
   at least one ghost agent configured to be associated with at least one of said hosts to replicate and record at least one action of said at least one of said host, wherein said ghost agent moves within a grid environment and is configured to include at least one of a test engine, a ghost log, and a controller, said test engine configured to load test routines into said ghost agent, execute the test routines in response to received test commands, and analyze within said ghost agent results of the executed test routines, said ghost log configured to store log data internally within said ghost agent and, periodically or at irregular intervals, deposit the log data to a local location, after which the ghost agent clears the ghost log, and said controller configured to accept control signals from an external source and control at least one of a life-span of said ghost agent and system resources used by said ghost agent;

at least one data-reaping object for retrieving log data stored at the local location and conveying the retrieved log data to a ghost log repository;

a customer service application configured to register the plurality of hosts for performing host-based operations to determine actions leading to at least one problem utilizing the at least one associated ghost agent and to convey control signals for synchronizing a plurality of ghost agents for performing customer service operations on one of the plurality of hosts, the customer service application having a service interface configured to prevent unauthorized access to the customer service application, wherein at least a portion of said hosts move from one grid within said grid environment to another grid, and wherein said ghost agents responsively move from said one grid to said another grid in response to movement of said associated host.

2. The customer service environment of claim 1, wherein said customer service application is further configured to debug said at least one reported problem using said ghost agents.

3. The customer service environment of claim 1, further comprising:

a service data store communicatively linked to a plurality of ghost agents, wherein said service data store is configured to record data generated by said ghost agents for use by said customer service application.

4. A machine-readable storage having stored medium thereon, a computer program having a plurality of code sections, said code sections executable by a machine for causing the machine to perform the steps of:

providing a customer service application configured to register a plurality of hosts operating in a plurality of grids in a grid environment for performing host-based operations and to convey control signals for synchronizing a plurality of ghost agents operating in said plurality of grids for performing customer service operations on one of the plurality of hosts, the customer service application having a service interface configured to prevent unauthorized access to the customer service application;

wherein said plurality of hosts are software objects for an application domain distributed within a grid environment, said grid environment being a distributed computing system that includes a plurality of hardware and software components;

receiving a problem indication relating to one of said plurality of hosts;

identifying at least one of the plurality of hosts operating within a grid of said grid environment;

associating a ghost agent within said grid with said at least one identified host, said ghost agent being configured to include at least one of a test engine, a ghost log, and a controller, wherein the test engine loads test routines into said ghost agent, executes the test routines in response to received test commands, and analyzes within said ghost agent results of the executed test routines, wherein the ghost log stores log data internally within said ghost agent and, periodically or at irregular intervals, deposits the log data to a local location, after which the ghost agent clears the ghost log, wherein said controller accepts control signals from an external source and controls at least one of a life-span of said ghost agent and resources used by said ghost agent, and wherein said ghost agent is configured to replicate at least one action of said at least one identified host within said grid;

retrieving log data stored at the local location and conveying the retrieved log data to a ghost log repository using at least one data-reaping object;

recording data relating to said replicated actions;

responding to said problem based at least in part upon said recorded data moving said at least one identified host from said grid to another grid within said grid environment; and, in response to said moving of said at least one identified host, moving said ghost agent from said grid to said another grid.

5. The machine-readable storage of claim 4, wherein said receiving step receives said problem indication from a user, wherein said associating step is performed responsive to receiving said problem indication, wherein said host of said associating step represents said user, and wherein said responding step further comprises using said recorded data to determine actions of said user that resulted in said problem.

6. The machine-readable storage of claim 4, further comprising the step of:

providing a customer service interface, wherein a customer service representative utilizes said customer service interface during said responding step.

7. The machine-readable storage of claim 4, said responding step further comprising the step of:

executing a test using said ghost agent, wherein said test utilizes said recorded data.

8. The machine-readable storage of claim 4, wherein said responding step further comprises the step of:

performing a debugging operation using said ghost agent, wherein said debugging operation utilizes at least one replicated action.

9. The machine-readable storage of claim 4, further comprising the step of:

comparing said recorded data with at least one operational threshold provided by said ghost agent, such that said recorded data includes results of said comparing step.

10. The machine-readable storage of claim 4, further comprising the steps of:

automatically detecting a problem within said user application; and automatically generating said problem indication responsive to said detecting step.

11. The machine-readable storage of claim 4, further comprising the step of:

responsive to receiving said problem indication, automatically routing application activity from an area of said grid environment in which said problem occurred to an alternative area of said grid environment.

12. The machine-readable storage of claim 4, further comprising the step of:

automatically fixing said problem based at least in part upon said recorded data.

13. The machine-readable storage of claim 4, further comprising the steps of:

selecting more than one of said plurality of hosts; and for each selected host repeating said associating step, said recording step, said responding step, and said moving steps.

14. The machine-readable storage of claim 4, further comprising the steps of:

identifying a location that is external to said ghost agent; and conveying said recorded data to said identified location.

15. The machine-readable storage of claim 4, further comprising the steps of:
- disassociating said ghost agent from said host; and
- associating said ghost agent with a different host within said grid.

16. A system, having at least one processor, for supporting an application within a grid environment comprising:
- means for registering a plurality of hosts operating in a plurality of grids in said grid environment for performing host-based operations and to convey control signals for synchronizing a plurality of ghost agents in said plurality of grids for performing customer service operations on one of the plurality of hosts, the customer service application having a service interface configured to prevent unauthorized access to the customer service application;
- wherein said plurality of hosts are software objects for an application domain distributed within a grid environment, said grid environment being a distributed computing system that includes a plurality of hardware and software components;
- means for receiving a problem indication relating to one of said plurality of hosts;
- means for identifying a host within a grid of said grid environment;
- means for associating a ghost agent within said grid with said host, said ghost agent being configured to include at least one of a test engine, a ghost log, and a controller, wherein the test engine loads test routines into said ghost agent, executes the test routines in response to received test commands, and analyzes within said ghost agent results of the executed test routines, wherein the ghost log stores information internal to said ghost agent, wherein said controller accepts control signals from an external source and controls at least one of a life-span of said ghost agent and resources used by said ghost agent, and wherein said ghost agent is configured to replicate at least one action of said at least one identified host within said grid;
- means for retrieving log data stored at the local location and conveying the retrieved log data to a ghost log repository;
- means for recording data relating to said replicated actions;
- means for responding to said problem based at least in part upon said recorded data;
- moving said at least one identified host from said grid to another grid within said grid environment; and,
- means for moving said ghost agent from one grid to within said grid environment to another grid in response to moving said host from said one grid to said another grid.

* * * * *